(12) United States Patent
Bosch (10) Patent No.: US 8,622,416 B2
(45) Date of Patent: Jan. 7, 2014

(54) AIRBAG MODULE (75) Inventor: Jerome Bosch, Romeo, MI (US)

(73) Assignee: TK Holdings Inc., Auburn Hills, MI (US)

( * ) Notice: Subject to any disclaimer, the term of this patent is extended or adjusted under 35 U.S.C. 154(b) by 148 days.

(21) Appl. No.: 12/986,939

(22) Filed: Jan. 7, 2011

(65) Prior Publication Data
US 2011/0169253 A1 Jul. 14, 2011

Related U.S. Application Data (60) Provisional application No. 61/282,254, filed on Jan. 8, 2010.

(51) Int. Cl.
B60R 21/217 (2011.01)
B60R 21/203 (2006.01)

(52) U.S. Cl.
USPC .................................. 280/728.2; 280/731

(58) Field of Classification Search
USPC ............................................. 280/728.2, 731
See application file for complete search history.

(56) References Cited

U.S. PATENT DOCUMENTS 2,336,767 A * 12/1943 Ash .......................... 301/35.625
4,796,808 A * 1/1989 Linda et al. ................... 239/175
5,259,641 A * 11/1993 Schenk et al. ................. 280/731
5,320,379 A * 6/1994 Burnard et al. ............. 280/728.2
5,765,860 A * 6/1998 Osborn et al. .............. 280/728.2
6,036,222 A * 3/2000 Holmes et al. ............. 280/728.2
6,213,502 B1 * 4/2001 Ryan et al. ..................... 280/736
6,431,582 B1 * 8/2002 Ennis et al. ................ 280/728.2
7,144,036 B2 * 12/2006 Kai .............................. 280/731
7,255,364 B2 * 8/2007 Bonam et al. .................. 280/731
7,384,064 B2 * 6/2008 Thomas et al. ................ 280/731
7,401,809 B2 * 7/2008 Lube ............................. 280/739
7,556,281 B2 * 7/2009 Olesko et al. ............... 280/728.2
2003/0025309 A1 * 2/2003 Schenck et al. ............... 280/735
2004/0113406 A1 * 6/2004 Elqadah et al. ............... 280/739
2007/0108740 A1 * 5/2007 Salmon et al. ............. 280/728.2
2009/0273165 A1 * 11/2009 Worrell et al. ............. 280/728.3

* cited by examiner

Primary Examiner — Paul Dickson
Assistant Examiner — Keith Frisby
(74) Attorney, Agent, or Firm — Foley & Lardner LLP (57) ABSTRACT An airbag module for use in a vehicle to provide restraint to an occupant of the vehicle. The module includes a cushion pack having an inflatable airbag cushion configured to inflate to restrain the occupant of the vehicle. An inflator is provided to supply inflation gas for inflating the airbag cushion. The module also includes an annular retaining member engaged with the cushion pack to thereby retain a portion of the cushion pack in the airbag module during deployment of the airbag cushion. An annular locking member is connected to the retaining member and to the inflator and is configured to prohibit substantial displacement of the inflator relative to the locking member during deployment of the airbag.

12 Claims, 12 Drawing Sheets

AIRBAG MODULE

CROSS-REFERENCE TO RELATED PATENT APPLICATIONS

This application claims priority to and the benefit of U.S. Provisional Patent Application No. 61/282,254, filed on Jan. 8, 2010. The foregoing provisional application is incorporated by reference herein in its entirety.

BACKGROUND

The present disclosure relates generally to the field of airbag modules for use in motor vehicles. More specifically, this disclosure relates to an airbag module having an improved configuration and method of assembly.

SUMMARY

According to a disclosed embodiment, an airbag module for use in a vehicle to provide restraint to an occupant of the vehicle is provided. The module includes a cushion pack having an inflatable airbag cushion configured to inflate to restrain the occupant of the vehicle. The module also includes an inflator configured to provide inflation gas for inflating the airbag cushion and an annular retaining member that engages with the cushion pack to thereby retain a portion of the cushion pack in the airbag module during deployment of the airbag cushion. An annular locking member is connected to the inflator and to the retaining member. The locking member is configured to prohibit substantial displacement of the inflator relative to the locking member during deployment of the airbag.

The retaining member may include inwardly protruding tabs that engage with a structural member located in the cushion pack. Both the retaining member and the locking member may be formed by connecting two portions together. The retaining member and the cushion pack may include corresponding alignment members or features that engage to ensure proper alignment of the cushion pack to the retaining member. The airbag module may also include a cover that is connected to the retaining member. The cover may be deformable or frangible to allow the airbag cushion to deploy through the cover into a compartment of the vehicle. The retaining member may include a mounting member to be connected to a structural member of the vehicle to thereby secure the airbag module in position in the vehicle a mounting member for connecting the airbag module to the vehicle.

DETAILED DESCRIPTION

With general reference to the figures, disclosed herein are airbag modules having an improved configuration to reduce the number of components, mass, and packaging volume. The airbag modules disclosed herein further allow for an improved assembly process by having independent attachment or coupling features, which permit the airbag modules to be assembled using a sequential build process. This allows for more flexibility of the assembly process and permits the automated manufacturing process to be simplified.

Airbag modules are typically located in vehicles to protect occupants from injury during a vehicle dynamic impact event, such as a frontal impact or roll-over event. Typically, airbag modules are connected to sensors located in the vehicle, which initiate deployment of the airbag based on information received and monitored through the sensors. Airbag modules often include at least one inflatable airbag cushion, which may deploy and inflate from high pressure gas, typically generated by an inflator. The inflator may contain an explosive charge (e.g., pyrotechnic device) or may include some other device for rapidly generating inflation gas, which enters the airbag cushion at a high volumetric flow rate and expands the cushion by increasing the internal chamber pressure of the airbag cushion. Airbags are typically packaged through a process of folding and rolling to compact the airbag in order to minimize its required packaging space. The packaging volume of airbags may be minimized by using a vacuum folding process, which may use a chamber having a hermetic seal that has a pressure significantly lower than the atmospheric pressure. For example, the vacuum folding process may include a sealing member (e.g., plastic bag) that encompasses the airbag cushion, which then is reduced in pressure relative to atmospheric pressure to reduce the volume occupied by the sealing member and internal airbag cushion. The sealing member then may be sealed hermetically to maintain the small volume and airtight seal during assembly and installation of the airbag module into the vehicle.

During a vehicle dynamic impact event, a passenger-side airbag (PAB) module may deploy from the upper portion (i.e., above the glove box) of the dashboard, in substantially rearward and upward directions to protect the head and torso of the occupant. PAB modules may also deploy from the rear facing portion of the dashboard in substantially a rearward direction towards the passenger. Driver-side airbag (DAB) modules are typically stored within the steering column and are typically packaged through a process of folding and rolling to compact the airbag in order to minimize its required packaging space. During a vehicle dynamic impact event, a driver airbag may deploy in substantially a rearward direction towards the driver to protect the head and torso of the driver.

Figure 1:
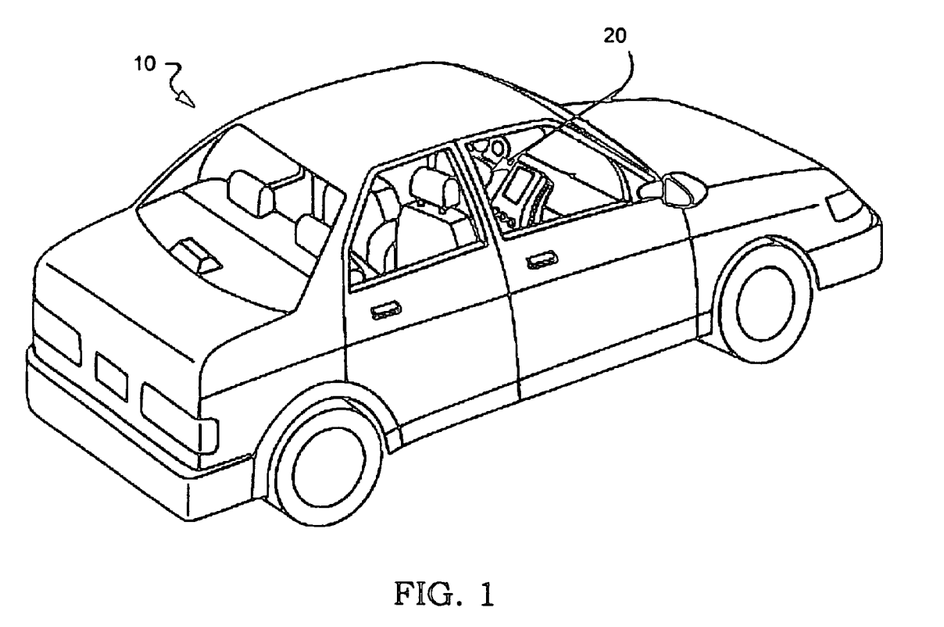
FIG. 1 is a perspective view of an exemplary embodiment of a motor vehicle.

As shown in FIG. 1, a motor vehicle 10 may include a DAB module 20 to provide driver protection by restraining the driver. The motor vehicle 10 may further include a PAB module or other airbag modules to provide protection to additional occupants. The vehicle 10 is illustrated as a typical sedan, but the airbag modules disclosed herein may be used within any type of passenger vehicle as well as other moving vehicles (e.g., military, mass-transit) that offer occupant protection to seated passengers in the form of frontal airbags. The airbag modules as disclosed herein may be used within any vehicle to provide any occupant (e.g., driver, passenger) with improved protection during a vehicle dynamic event that triggers deployment of an airbag cushion.

Figure 2:
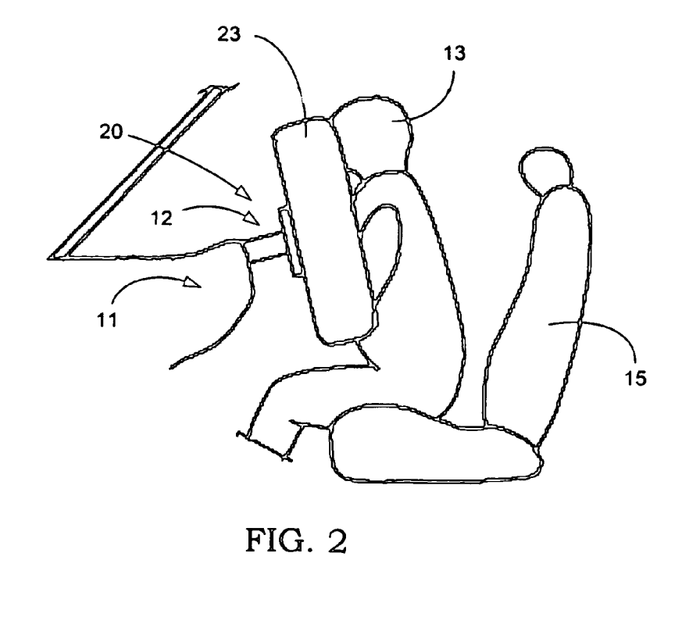
FIG. 2 is a cross-car partial sectional view of the driver-side airbag shown deployed or inflated, providing restraint to an occupant.

As shown in FIG. 2, the DAB module 20 may include an inflatable airbag cushion 23, which is illustrated in the deployed or inflated position provided between the occupant 13 the steering column 12. The inflated airbag cushion 23 of the DAB module 20 provides the occupant (e.g., driver) with protection by restraining the driver, such as, for example, from contacting the steering column 12 and/or instrument panel 11 of the vehicle 10 during an airbag deploying event of the vehicle 10. Typically, deployment of a DAB module 20 is triggered by a dynamic impact of the vehicle, whereby impact sensors (not shown) communicate to a vehicle control module (not shown) or other device which communicates to the inflator 21 of the airbag module 20 to initiate generation of inflation gas, which is then forced into the inflatable airbag cushion 23. As the inflation gas forced into the airbag cushion of the DAB module increases, the internal chamber pressure of the airbag cushion 23 increases, allowing the airbag cushion 23 to breach the steering column (or other storing member) and the airbag module 20, whereby the airbag cushion 23 deploys substantially outward (i.e., substantially perpendicular to the longitudinal or fore-aft axis of the vehicle or at an oblique angle relative to the fore-aft direction of the vehicle 10) and rearward toward the occupant 13. The airbag module 20 improves occupant safety by providing restraint to the occupant 13 through the airbag cushion 23 and limiting displacement of the decelerating occupant to mitigate the momentum and kinetic energy of the occupant 13. The deployed airbag cushion 23 absorbs energy (e.g., kinetic energy) and the forces exerted from the occupant 13 from being decelerated. The airbag cushion 23 of the airbag module 20 further reduces occupant injury by reducing or eliminating impact of the occupant 13 with substantially rigid vehicle components, such as the steering column 12.

Figure 3:
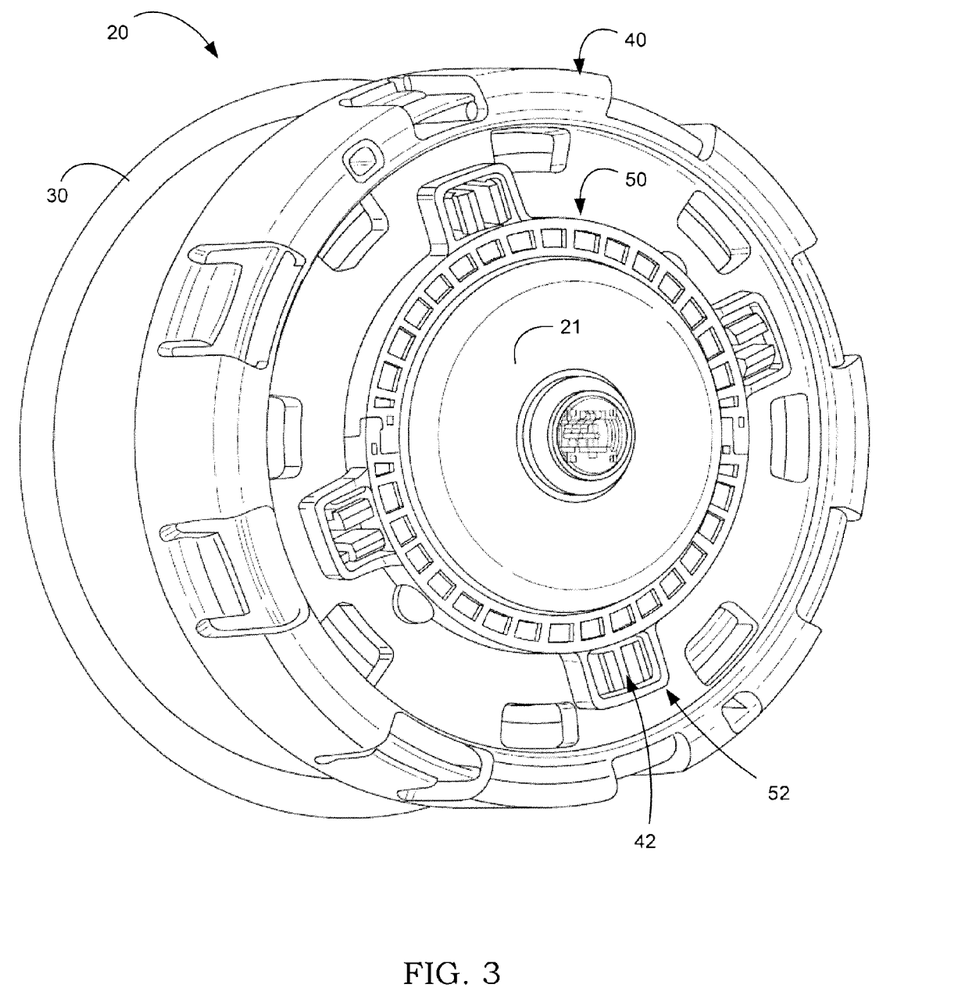
FIG. 3 is a perspective view of an exemplary embodiment of a driver-side airbag module.

FIGS. 3-7B disclose a DAB module 20. The module 20 includes an inflator 21, a cushion pack 22, a cover 30, a retaining member (or ring) 40, and a locking member (or ring) 50. FIG. 3 illustrates the assembled DAB module 20, whereby the retaining member 40 retains the cushion pack 22 and connects to the locking member 50, which retains the inflator 21 adjacent to the cushion pack 22. The cover 30 is provided over the cushion pack 22, and engages the retaining member 40.

Figure 7A:
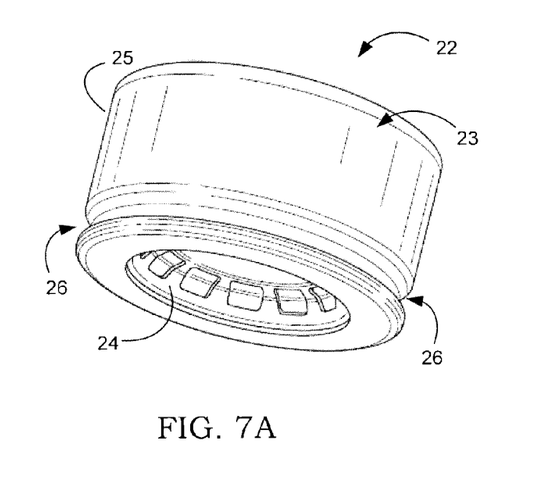
FIG. 7A is an exemplary embodiment of a airbag cushion pack for use in a driver-side airbag module, such as the driver-side airbag module of FIG. 3.

The cushion pack 22 includes an inflatable airbag cushion 23 and may include a structural member (e.g., cushion ring) 24. The inflatable airbag 23 may be coupled to the structural member 24 thereby forming a retaining groove 26 in the cushion adjacent to the structural member 24. The retaining groove 26 is configured to allow retention of the cushion pack 22 by the retaining member 40. The airbag cushion 23 may be configured through folding, rolling, or a combination of folding and rolling to allow a reduced packaging volume, but does not have to be vacuum sealed. As shown in FIG. 7A, the cushion pack 22 includes the inflatable airbag cushion 23, the structural member (or cushion ring) 24 provided adjacent to the cushion 23, and may also include a sealing member 25 covering the airbag cushion 23.

Figure 7B:
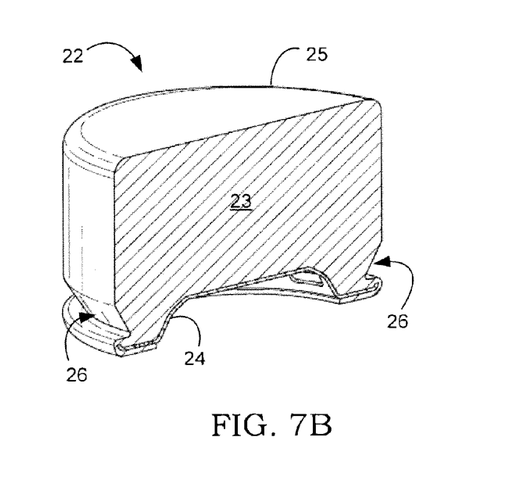
FIG. 7B is a sectional view of the airbag cushion pack of FIG. 7A.

The airbag cushion 23 may be made from any suitable material (e.g., woven nylon fabric) and may be any suitable shape, which may be tailored to meet specific customer requirements. The airbag cushion 23 may be coated with a sealant (e.g., silicone) to prohibit inflation gas from escaping through the porosity of the cushion. The structural member 24 is coupled to the airbag cushion 23 to provide strength to the cushion pack 22 (e.g., during airbag cushion 23 deployment), whereby the structural member 24 and airbag cushion 23 form a retaining groove 26. The retaining groove 26 may be configured as an undercut portion of the cushion pack 22 to aid in retention of the cushion pack 22 by the retaining member 40. The structural member 24 may be made from steel, a composite (e.g., glass reinforced nylon, glass reinforced polypropylene), or any suitable material that is substantially rigid and provides the necessary strength to withstand the high forces created during airbag deployment.

The sealing member 25 may be a thin flexible airtight or impermeable material (e.g., a polymer), configured to encompass the coupled inflatable airbag cushion 23 and to form a vacuum sealed chamber having a relative low pressure relative to atmospheric pressure. The sealing member 25 may form a hermetic seal of low pressure to optimally reduce the packaging volume of the cushion pack 22. The sealing member 25 is configured to allow the deploying airbag cushion 23 to breach the sealing member 25 without impediment or delay.

Figures 8A, 8B:
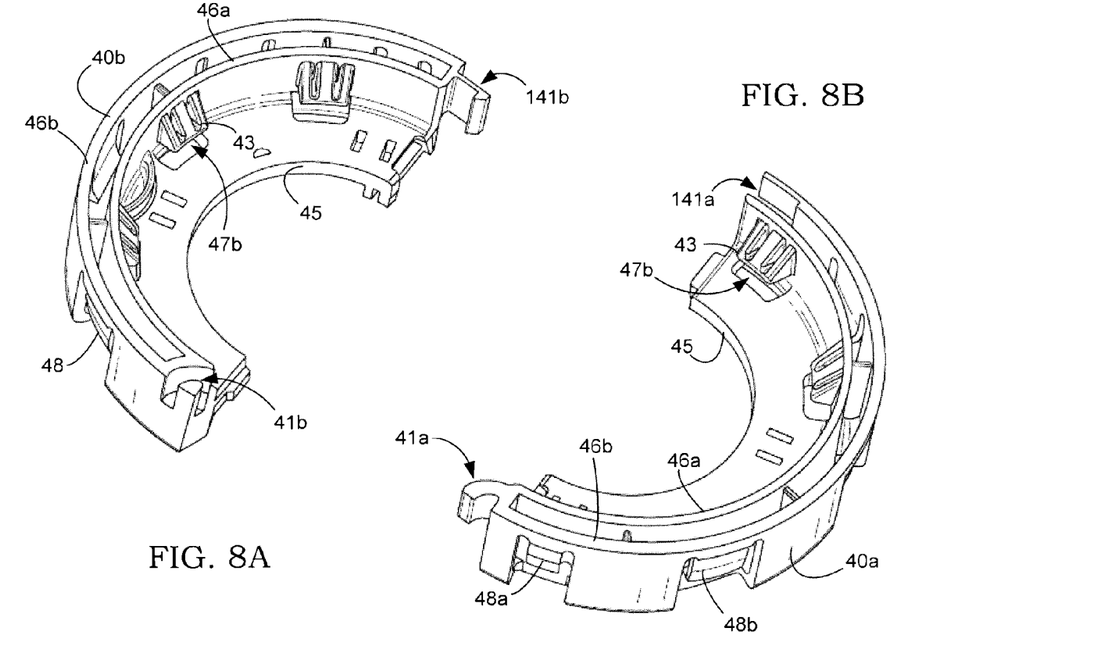
FIG. 8A is a perspective view of an exemplary embodiment of a portion of the retaining member for use in a driver-side airbag module, such as the driver-side airbag module of FIG. 3.
FIG. 8B is a perspective view an exemplary embodiment of another portion of the retaining member for use in a driver-side airbag module, such as the driver-side airbag module of FIG. 3.
Figure 8C:
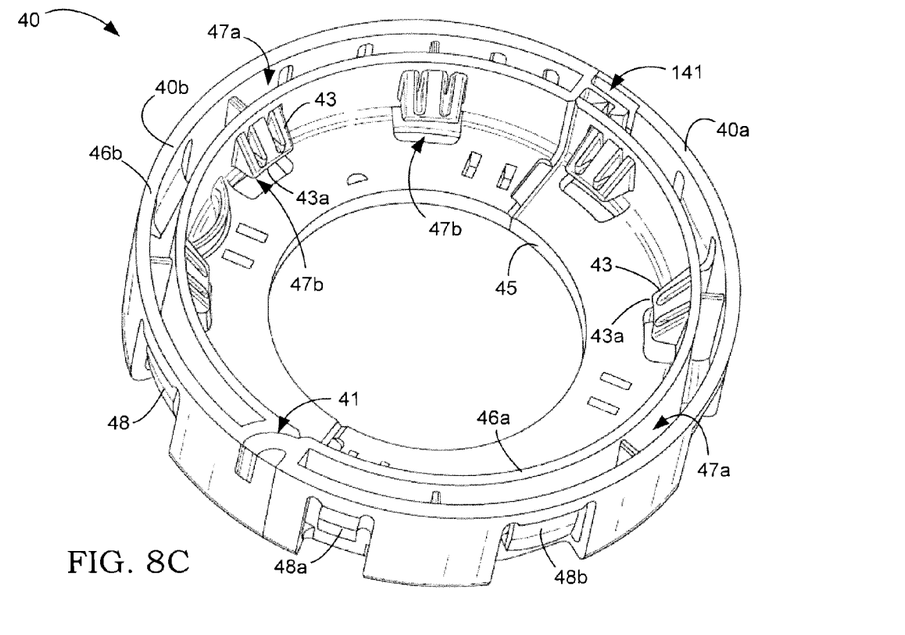
FIG. 8C is a perspective view of the first retaining portion of FIG. 8B coupled to the second retaining portion of FIG. 8A.

As shown in FIGS. 8A-8C, the annular shaped retaining member 40 may be assembled from two portions. A first retaining portion (or ring) 40a (as shown in FIG. 8B) may form substantially half of the annular retaining member 40, and a second retaining portion (or ring) 40b (as shown in FIG. 8A), may form substantially the other half of the annular retaining member 40. Alternatively, the retaining member may be made out of more than two portions. Each of the plurality of portions may have substantially similar or varying circumferential lengths (or portions). Thus, each of the plurality of portions may form varying amounts of the retaining member.

The first and second retaining portions 40a, 40b forming the retaining member 40 may be made out of a composite material (e.g., glass reinforced nylon, glass reinforced polypropylene) or any suitable material having the strength to withstand the high forces induced during airbag deployment, and may be made through an injection molding or any suitable process. The first retaining portion 40a may be connected to the second retaining portion 40b using at least one connector (or first coupling mechanism) 41. The portions 40a, 40b of the retaining member 40 upon connection may retain the cushion pack 22 in place relative to the retaining member 40, prohibiting substantial displacement of the cushion pack 22 in the longitudinal direction relative to the retaining member 40.

The retaining member 40 of the DAB module 20 may include a connector 41 for coupling a first end of the first retaining portion 40a to a first end of the second retaining portion 40b and a connector 141 for coupling a second end of the first retaining portion 40a to a second end of the second retaining portion 40b. The DAB module 20 may further include an attachment member configured to couple the retaining member 40 to the locking member 50. The retaining member 40 may also include an attachment member (or second coupling mechanism) 42 configured to engage an attachment member (or second coupling mechanism) 52 of the locking member 50, thereby coupling the retaining member 40 to the locking member 50. As discussed herein, the locking member 50 may include a connector for coupling together portions of the locking member 50, which may be configured similarly or differently than the connector of the retaining member 40.

The connector 41 of the retaining member 40 may include a feature 41a on the first retaining portion 40a that is configured to engage a mating feature 41b on the second retaining portion 40b. For example, the feature 41a of the first retaining portion 40a may be configured as an arc-shaped member that is configured to engage the feature 41b of second retaining portion 40b, whereby the feature 41b is configured as an arc-shaped void, such as shown in FIG. 8C.

As shown in FIG. 8C, the connector 141 of the retaining member 40 may include a feature 141b of the second retaining portion 40b that is configured to engage a feature 141a of the first retaining portion 40a. The feature 141b of the second retaining portion 40b is a hook (or tab) having an extruded portion with a detent near the end on one side of the extruded portion that is configured to engage the feature 141a on the first retaining portion 40a, whereby the feature 141a is an opening configured to receive the hook feature 141b. The opening feature 141a may further include a detent or protrusion that is configured to engage the detent of the hook feature 141b thereby locking the first and second retaining portions 40a, 40b together through the connector 141.

The connector 141 or a portion of the connector 141 may be flexible or compliant. For example, the hook feature 141b may be flexible or compliant allowing the hook to flex when the detent of the hook feature 141b is passed over the detent of the opening feature 141a and allowing the hook to return to the pre-flexed configuration when the detent of the hook feature 141b passes beyond the detent of the opening feature 141a. The leading surfaces of the detents of the hook feature 141b and the opening feature 141a may be configured as ramps or oblique surfaces (relative to the angle of engagement) to provide easier engagement between the two detents by allowing a lateral force to bend or flex the hook feature 141b.

The connector 141 may be configured to lock the first and second retaining portions 40a, 40b together. For example, the detents of the hook feature 141b and opening feature 141a may be configured to resist separation by having surfaces that engage one another in a direction substantially transverse to the direction of flex (or bending). Upon loading, the hook feature 141b may be subjected to tensile forces and the detent subjected to shear forces with little or no bending forces, while the detent of the opening feature 141a may be subjected to shear forces.

Figure 9:
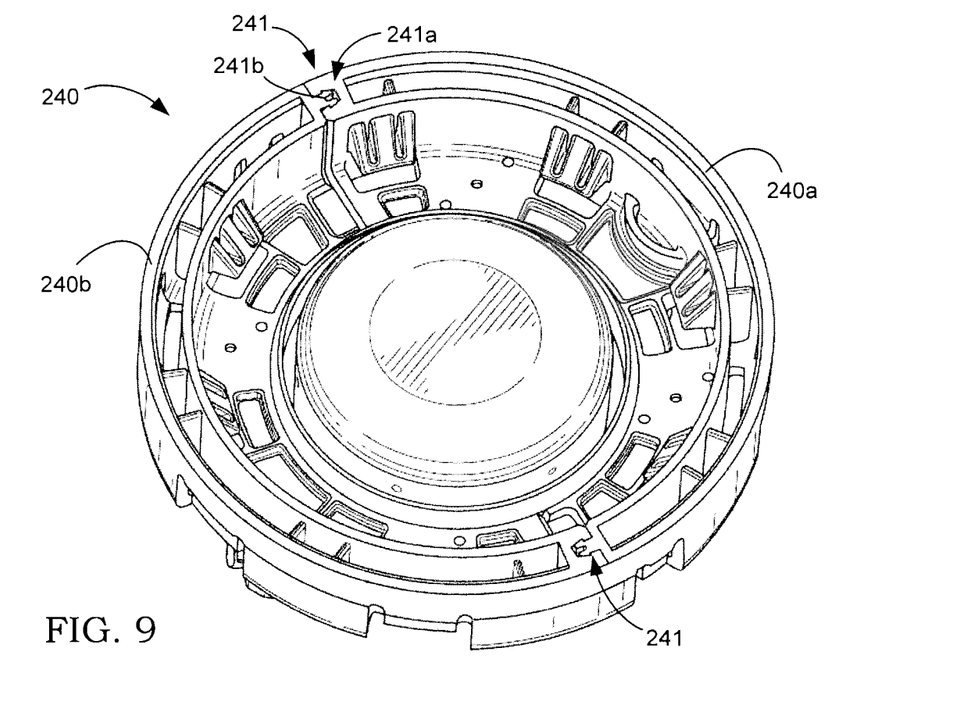
FIG. 9 is a perspective view of another exemplary embodiment of a retaining member.

According to yet another exemplary embodiment shown in FIG. 9, the first retaining portion 240a is connected to the second retaining portion 240b through a plurality of connectors 241, thereby forming the retaining portion 240. The connector 241 includes a flexible tab feature 241b on one retaining portion that is configured to engage or fill an opening (or void) feature 241a on the mating retaining portion. The tab feature 241b includes detents on both sides of a slot or void that is configured to have a locking fit with the opening feature 241a.

The tab feature 241b may have an interference fit with the opening feature 241a, whereby insertion of the tab feature 241b into the opening feature 241a compresses the tab feature 241b by displacing the detents into the slot to allow the tab to pass into the opening of the opening feature 241a. The opening feature 241a includes a cavity that is larger (i.e., larger cross-section) relative to the opening to allow the detents of the flexible tab feature 241b to displace back to a substantially non-displaced shape. Thus, the tab feature 241b may be retained by the opening feature 241a.

Additionally, each end of retaining portions may have a connector feature, so that both ends of the retaining portions may be coupled together. According to other exemplary embodiments, the retaining portions of the retaining member may be coupled by a weld (e.g., sonic weld), an adhesive, or any combination of methods. Those skilled in the art will recognize that any suitable method for coupling the retaining member together may be used, and those disclosed herein are not meant to be limitations.

Figure 4:
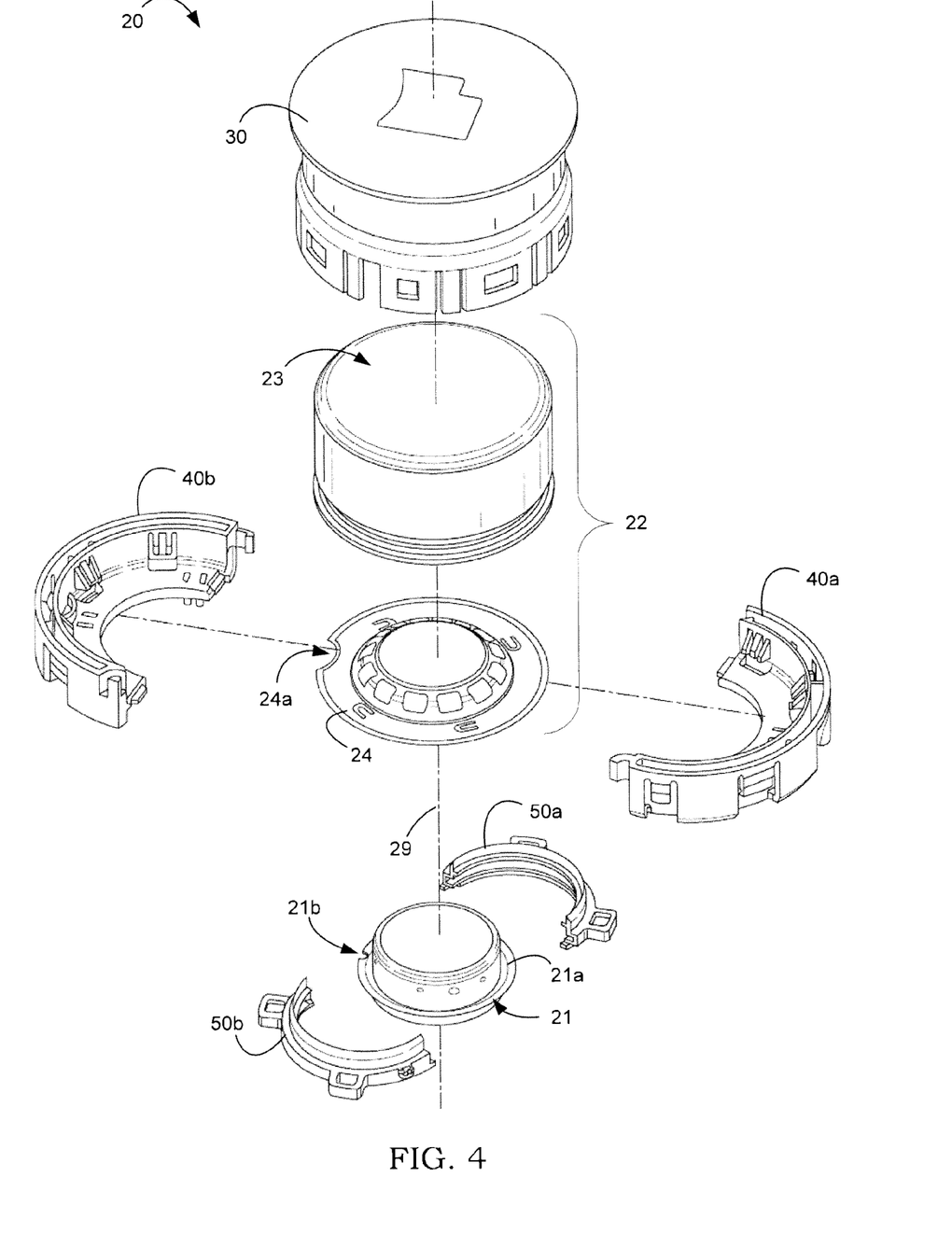
FIG. 4 is an exploded perspective view of the driver-side airbag module of FIG. 3.
Figure 5:
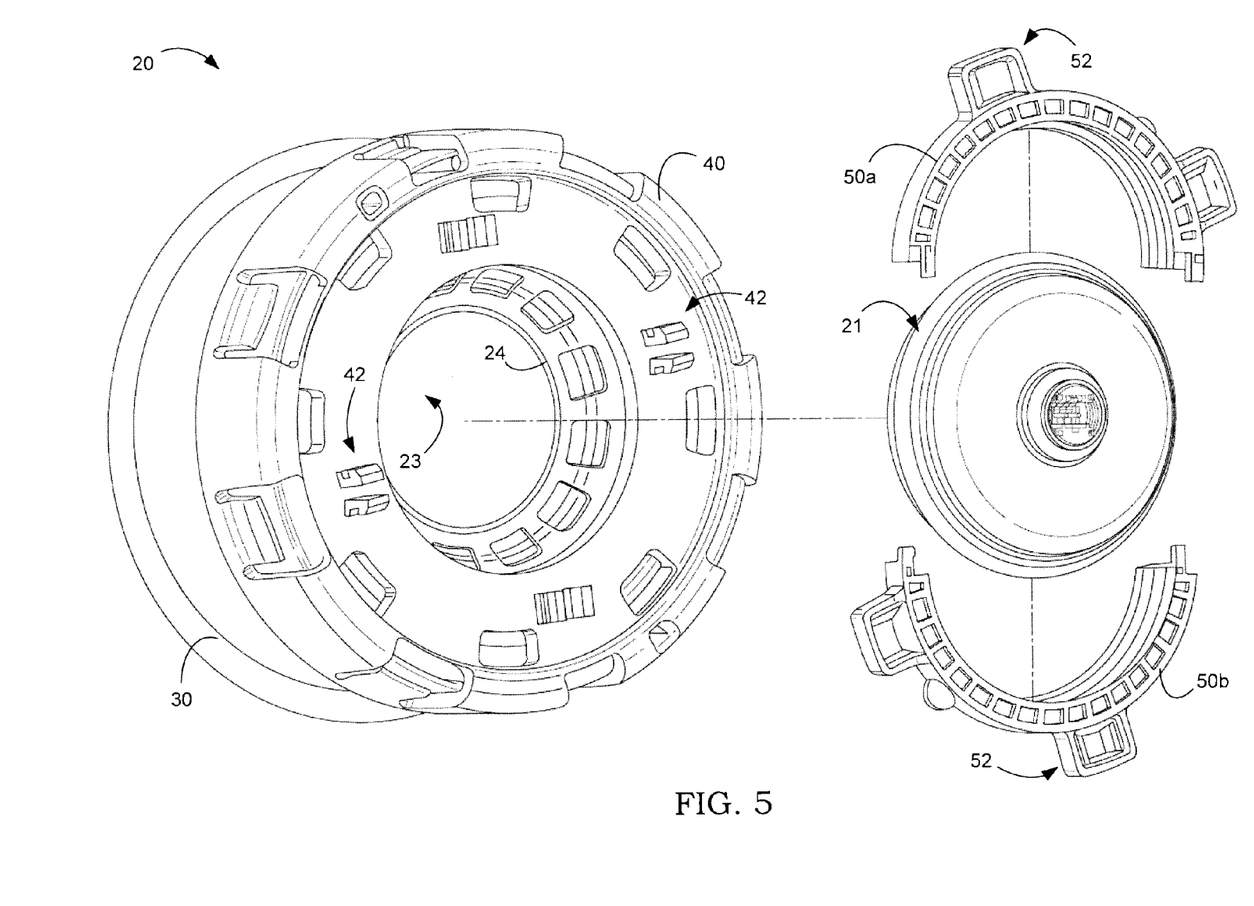
FIG. 5 is a partial exploded perspective view of the driver-side airbag module of FIG. 3.
Figure 6:
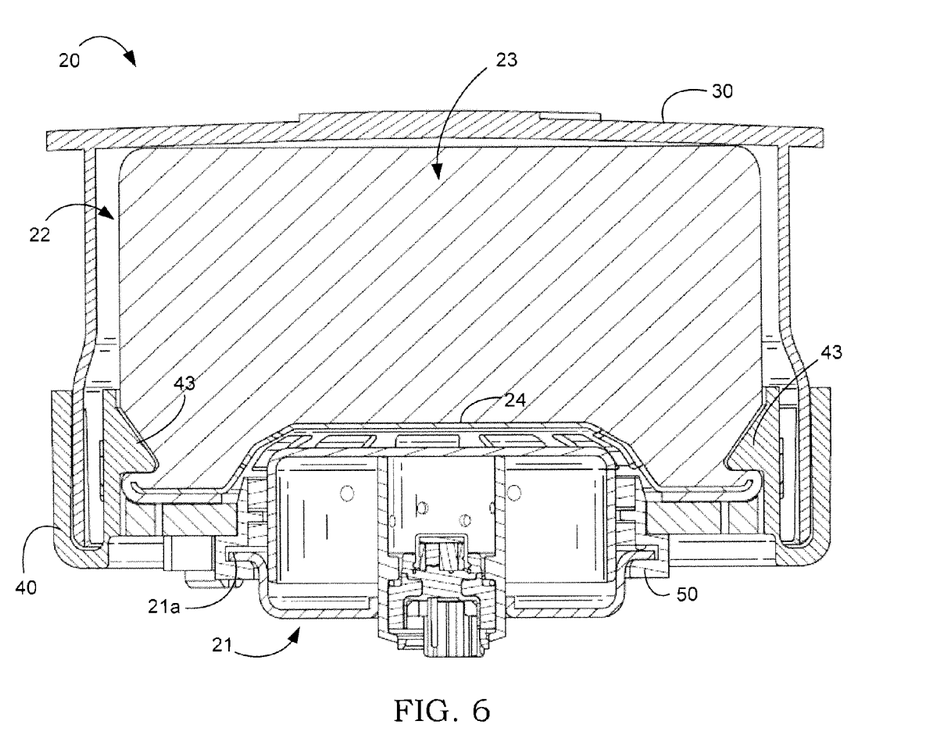
FIG. 6 is a sectional view of the driver-side airbag module of FIG. 3 illustrating the tabs of the retaining member engaged with the retaining groove of the cushion pack.
Figure 11:
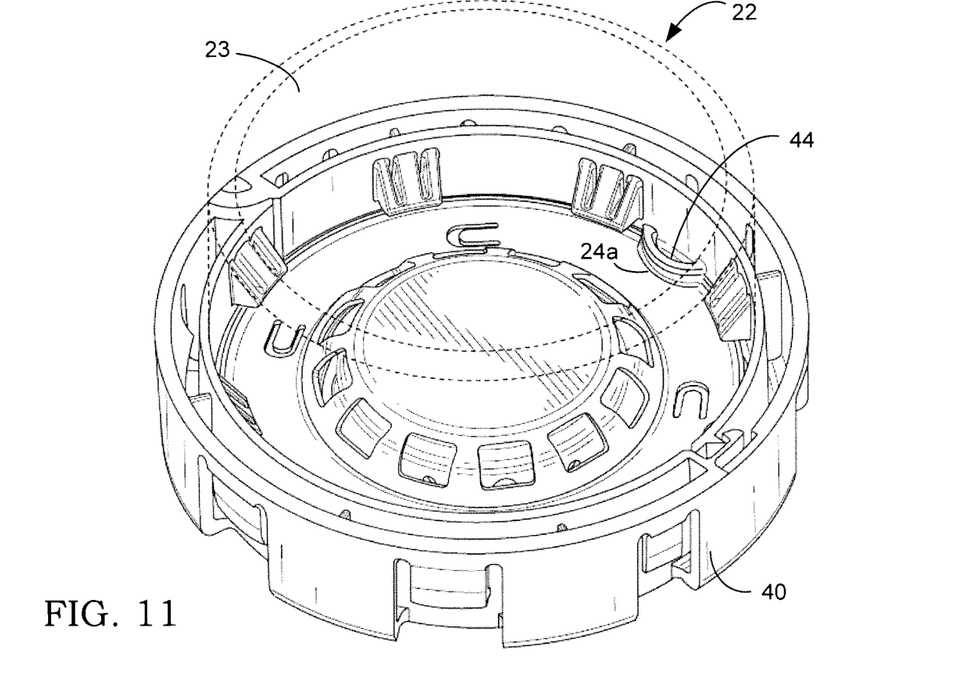
FIG. 11 is a perspective view illustrating an exemplary embodiment of an alignment feature for creating a predetermined alignment between the retaining member and the cushion pack.

The retaining member 40 may further include an aligning member (e.g., emboss, protrusion, key-way) that engages to a mating aligning member on the cushion pack 22, which aligns the rotational orientation or relationship (i.e., rotation about the longitudinal axis 29) between the retaining member 40 and the cushion pack 22. The aligning member 44 (e.g., emboss, protrusion, key-way) engages a corresponding aligning void or recess 24a (as shown in FIG. 4) on the structural member 24 of the cushion pack 22, which aligns the rotational relationship between the retaining member 40 and the structural member 24 (and hence the cushion pack 22). As shown in FIGS. 9 and 11, the aligning member 44 of the retaining member 40 may be configured as a semi-circular emboss, which engages the mating semi-circular aligning void 24a in the structural member 24 of the cushion pack 22. Thus, the rotational alignment (about the longitudinal axis 29) between the retaining member 40 and the cushion pack 22 is determined.

The airbag cushion 23 may be coupled to the structural member 24 to prohibit rotation of the cushion 23 about the longitudinal axis 29 of the DAB module 20 relative to the retaining member 40. Thus, the DAB module 20 has a repeatable and reliable method for positioning or aligning the airbag cushion 23 relative to the DAB module 20, which may be installed in each vehicle the same way. This repeatable alignment ensures a repeatable deployed airbag cushion location that provides optimal occupant protection, because the airbag cushion design (e.g., shape, tether locations, vent locations) may be configured to provide optimal occupant protection for a predetermined deployed location relative to the occupant and vehicle environment.

The first and second retaining portions 40a, 40b that form the retaining member 40 may be semi-annular in shape, and include a base 45 configured to support the structural member 24 of the cushion pack 22. The retaining portions 40a, 40b further include an inner wall 46a and an outer wall 46b that extend substantially perpendicular from the base 45 and are separated by a gap 47a, which is configured to allow access of the cover 30 into the gap 47a. Extending in the radial direction towards the center of the retaining member 40 from the inside surface of the inner walls 46a of the retaining portions 40a, 40b are a plurality of retention members (or protruding tabs) 43. The tab 43 includes a retaining surface 43a, which is substantially parallel and offset from the base 45, thereby forming a second gap 47b between the base 45 and the retaining surface 43a.

Figure 10:
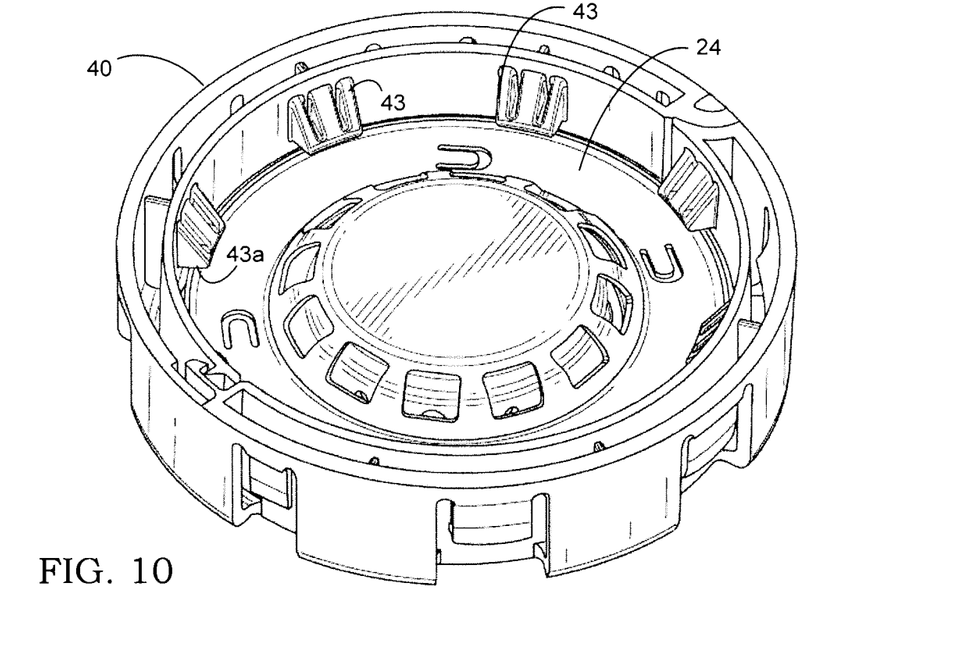
FIG. 10 is a perspective view illustrating the cushion ring being held substantially fixed between the tabs and the base of the retaining member.

The second gap 47b is configured to receive the structural member 24 of the cushion pack 22. Upon coupling the retaining portions 40a, 40b of the retaining member 40, the structural member 24 is retained between the tabs 43 and the base 45 of the retaining member 40, prohibiting substantial movement along the length of the longitudinal axis 29 of the structural member 24 (and hence the cushion pack 22 as well) relative to the retaining member 40. Thus, the structural member 24 may be retained by the tabs 43 of the retaining member 40, as shown in FIG. 10.

The tabs 43 of the retaining member 40 are configured to be substantially rigid to provide strength and withstand the forces induced by the cushion ring during airbag deployment from the expanding airbag cushion. Since the structural member 24 and/or cushion pack 22 may be assembled with the retaining member 40 by bringing the retaining portions 40a, 40b together around the structural member 24 and/or cushion pack 22, neither the tabs 43 nor the structural member 24 have to be configured to deflect (or flex) relative to the other, such as if the retaining member were one piece and the structural member was coupled by pushing the retaining and structural members together in the axial (longitudinal) direction. It should be noted that the size and quantity of the tabs 43 may be tailored to meet varying load situations, and those embodiments disclosed herein are not meant as limitations.

The retaining portions 40a, 40b of the retaining member 40 may further include an attachment member (or second coupling mechanism) 42 that is configured to connect the retaining member 40 to the locking member 50. According to the exemplary embodiment shown in FIG. 12, the attachment member 42 includes two extruded portions 42a that extend from the bottom surface 45a of the base 45 of the retaining member 40, whereby each extruded portion 42a has a ramp (or oblique) shaped detent feature near the end farthest from the base 45. Each extruded portion 42a of the attachment member 42 may be flexibly configured to engage a corresponding mating portion of the attachment member 52 of the locking member 50.

Figure 12:
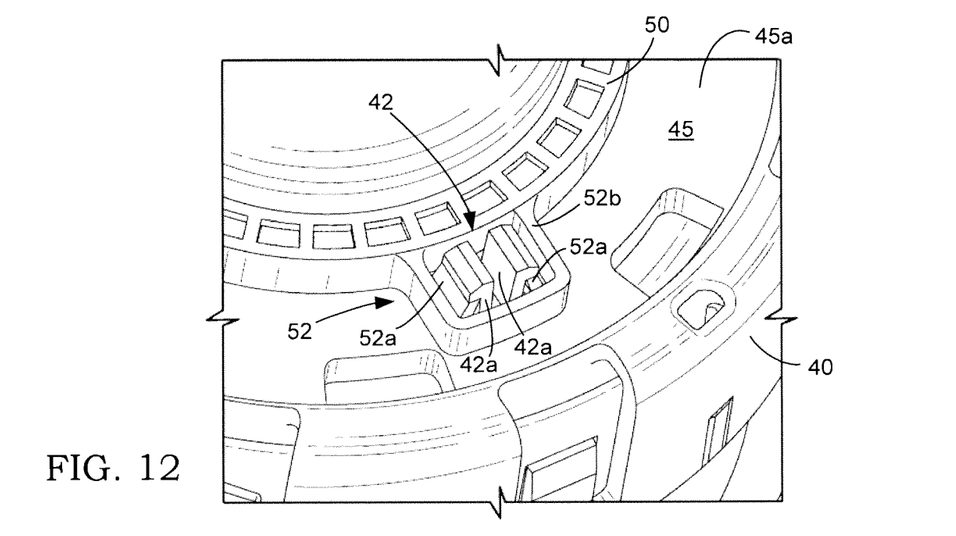
FIG. 12 is a partial perspective view of an exemplary embodiment of an attachment member, for coupling the locking member to the retaining member.

When the attachment member 52 located on the locking member 50 is brought into contact with the mating portion of the attachment member 42 located on the retaining member 40 there is an interference fit between the detent of each extruded portion 42a and the corresponding mating attachment member 52 of the locking member 50 that elastically displaces each extruded portion 42a (creating stored biasing energy) so that the mating portion of the attachment member 52 of the locking member 50 may pass the detent of each extruded portion 42a. Each extruded portion 42a may have an undercut (or void) provided between the bottom surface 45a of the base 45 and the detent of the extruded portion 42a to lock the extruded portion 42a (e.g., the detent) to the mating portion of the attachment member 52 as the stored biasing energy returns the extruded portions 42a to their free positions. Thus, when the locking member 50 is displaced beyond the interference engagement with (i.e., moved closer toward) the retaining member 40, the attachment member 52 of the locking member 50 engages the undercut portion of the attachment member 42 allowing the detent to displace back to the free position (i.e., pre-displaced position) due to the stored biasing energy.

The attachment member 42 of the retaining member 40 connects to the attachment member 52 of the locking member 50, coupling the retaining member 40 to the locking member 50. The airbag module 20 may be configured to include any number of such connections, which may be tailored to accommodate the loading that the airbag module is subjected to during airbag deployment. For example, the airbag module 20 includes four such connections, shown in FIG. 13B.

Figure 18:
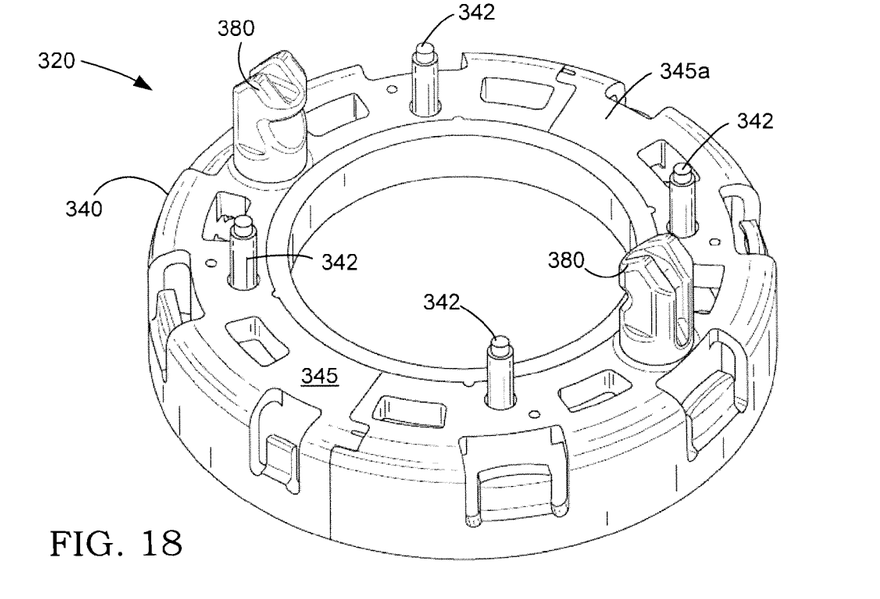
FIG. 18 is a perspective view of the retaining member.

The connection between the retaining and locking members may be formed by an attachment member that includes one extruded portion that extends from the bottom surface of the base of the retaining member that engages a mating attachment member of the locking member. According to other exemplary embodiments, the attachment member may be any snap feature configuration or any method for coupling the retaining member to the locking member. The attachment member may be any conventional fastener (e.g., bolt, rivet), may be any chemical method (e.g., adhesive, epoxy), or may be any weld (e.g., sonic weld). For example, as shown in FIG. 18, the attachment member may be configured as a stud 342 that is integrally formed with the retaining member 340 and extends substantially perpendicular from the bottom surface 345a of the base 345 in a direction away from the base 345. The stud 342 may be separately formed then coupled to the retaining member 340. The studs 342 may be pressed fit, key-way fit, or held by clamp force to the retaining member 340, and may be configured to engage an attachment member (e.g., nut) 343. The attachment member 343 may be separately formed then connected to or integrally formed with the locking member 350 and/or the inflator 321.

The retaining member 340 and/or the DAB module 320 may include a mounting (or attachment or coupling) feature or member to couple the module to the vehicle. According to the exemplary embodiment shown in FIGS. 18 and 19, the mounting members 380 are integrally formed into the retaining member 340. The mounting member 380 may take any suitable or conventional shape. According to other embodiments, the mounting member may be formed separately then coupled to the retaining member. The mounting member may be configured to receive any suitable feature (e.g., conventional fastener, snap), or may be configured to engage a receiving device of the vehicle.

Figure 13A:
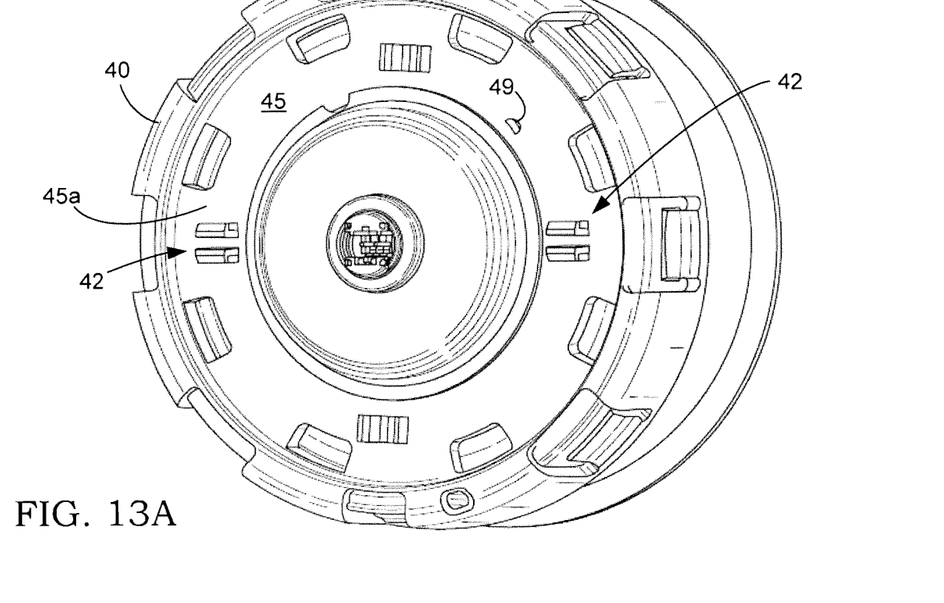
FIG. 13A is a perspective view illustrating an exemplary embodiment of an alignment feature in the retaining member for creating a predetermined alignment between the retaining member and the locking member.
Figure 13B:
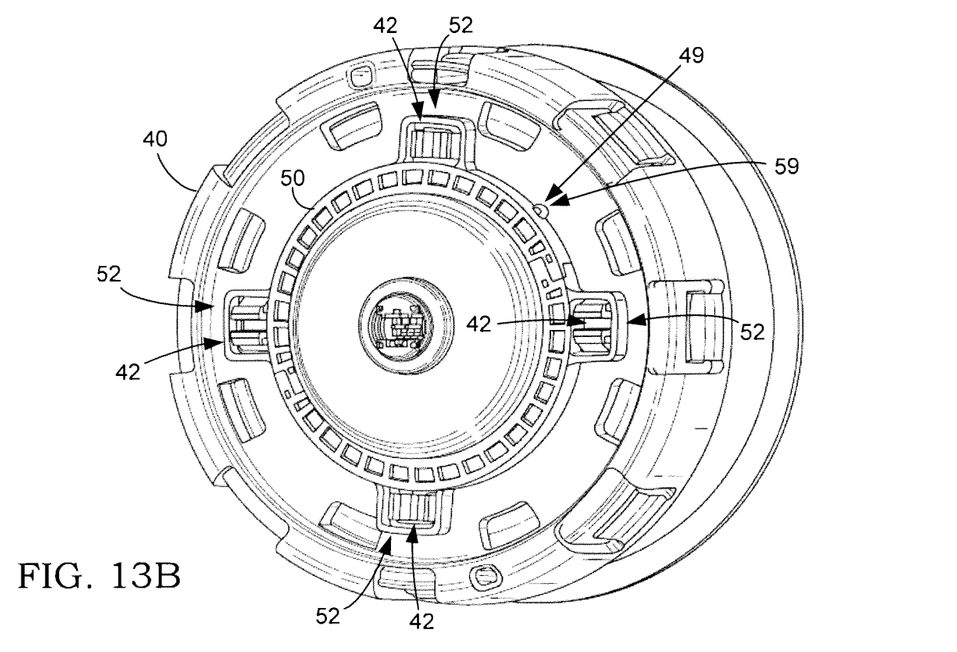
FIG. 13B is a perspective view illustrating an exemplary embodiment of an alignment feature in the locking member for creating a predetermined alignment between the retaining member and the locking member.

As shown in FIGS. 13A and 13B, the retaining member 40 may include an alignment (or orientation) member (or feature) 49 that is configured to align the rotational orientation or relationship between the retaining member 40 and the locking member 50 by engaging a mating alignment member (or feature) 59 of the locking member 50. The alignment member of the retaining member may be an emboss, a protrusion, a key-way feature, or any suitable feature configured to engage a mating shaped member of the locking member, or vice versa (i.e., the locking member may include an emboss that engages a mating member of the retaining member). According to an exemplary embodiment, the retaining member 40 includes an alignment member 49 configured as a protruded portion that extends from the bottom surface 45*a* of the base 45, and the locking member 50 includes a mating alignment member 59 that is configured to encircle at least a portion of the protruded alignment member 49 of the retaining member 40. According to another exemplary embodiment, the locking member includes a protruded portion that extends into an aperture (or mating feature) into the base of the retaining member to retain the protruded portion of the locking member. Thus, the alignment members 49, 59 ensure proper rotational alignment (or position or orientation) of the locking member 50 relative to the retaining member 40 when coupled together.

Figure 14:
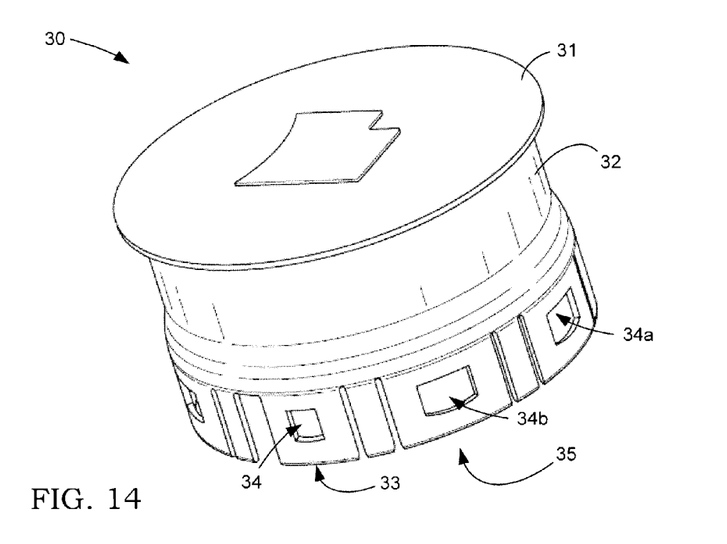
FIG. 14 is a perspective view of an exemplary embodiment of a cover.

With reference to FIG. 14, an exemplary embodiment of a cover 30 is illustrated. The cover 30 may be made from a polymer or composite material, and may be configured to protect the cushion pack. According to an exemplary embodiment, the cover 30 includes a top member 31 and an annular wall 32 that extends substantially perpendicular from the top member 31 thereby forming a cavity 35 configured to house the cushion pack 22 of the airbag module 20. The wall 32 of the cover 30 may include at least one member (or engagement member or engagement mechanism) 33 for connecting the cover to the airbag module, such as to the retaining member. The engagement member 33 may be a substantially a rectangular-shaped extension from the wall 32, having an opening or aperture 34 that is configured to receive a mating hook member 48 of the retaining member 40.

The cover 30 may further include an alignment member configured to engage the retaining member 40 to ensure proper alignment (or orientation) of the cover 30 relative to the retaining member 40. According to the exemplary embodiment shown in FIG. 14, the alignment member of the cover includes a first opening 34*a* having a unique size (e.g., width) relative to a second opening 34*b*, whereby the position of the first opening 34*a* is uniquely configured relative to the second opening 34*b* to allow for only one position of the cover relative to the retaining member. According to other embodiments, the engagement members 33 and/or the openings 34 may be configured to ensure proper alignment between the cover 30 and the retaining member 40. The cover may further include a tear seam, which may be configured to tear to allow the deploying airbag cushion to breach the cover without impediment or delay. Often, the cover may include more than one tear seam that are configured uniquely or non-symmetrically to tailor the tearing of the cover to the configuration of the airbag cushion being deployed. The cover may further include a symbol (or emblem), such as a trademark to identify the manufacturer of the airbag module. Thus, the alignment member of the cover 30 ensures proper alignment of the tear seam and/or the symbol for functional and/or aesthetic purposes.

The wall 32 of the cover 30 may be configured to engage the gap 47*a* of the retaining member 40. The hook member 48 of the retaining member 40 may be configured to extend from the inner wall 46*a* or the outer wall 46*b*. The hook member 48 may take any suitable shape, such as an L-shape or J-shape. According to an exemplary embodiment, the retaining member 40 includes a plurality of L-shaped hook members 48 extending from the outer wall 46*b* such that the base of the L-shaped hook member 48 extends toward (but short of) the inner wall 46*a*. Each L-shaped hook member 48 is configured to engage one corresponding opening 34 in the cover 30 to couple the cover 30 to the retaining member 40.

Figure 15:
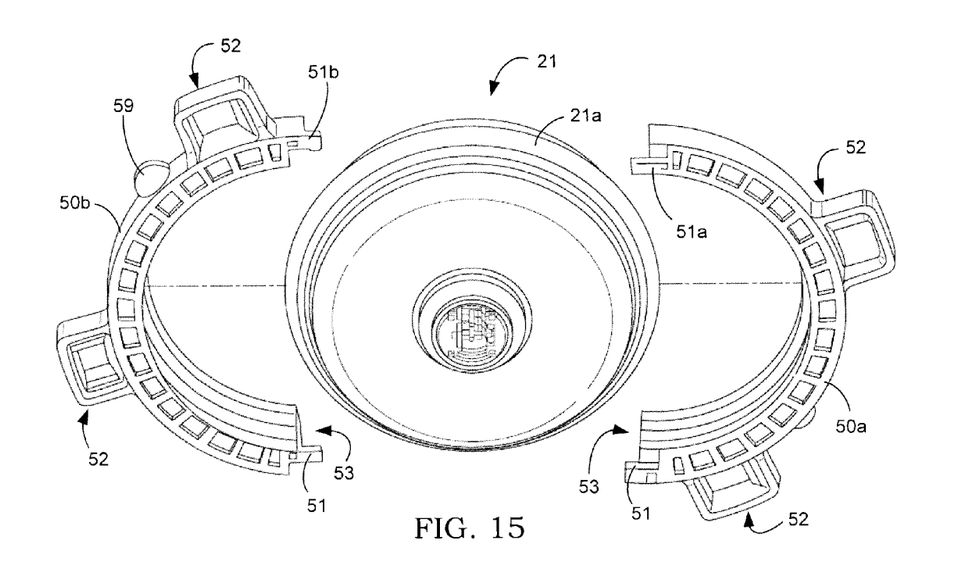
FIG. 15 is an exploded perspective view of an exemplary embodiment of an inflator positioned between two locking portions of an exemplary embodiment of a locking member.
Figure 16:
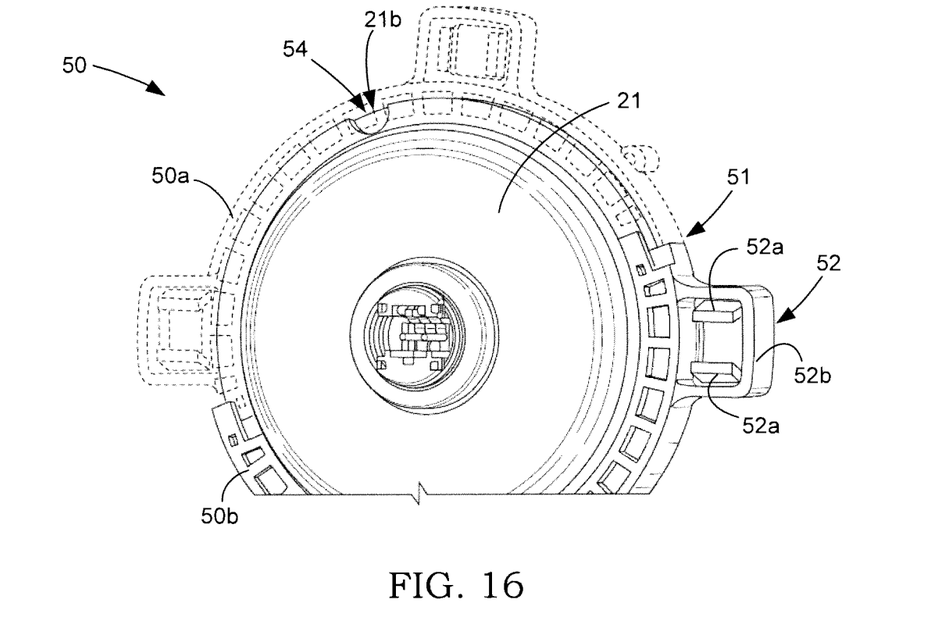
FIG. 16 is a perspective view illustrating an exemplary embodiment of an alignment feature for aligning the rotational orientation of the inflator relative to the locking member.
Figure 17:
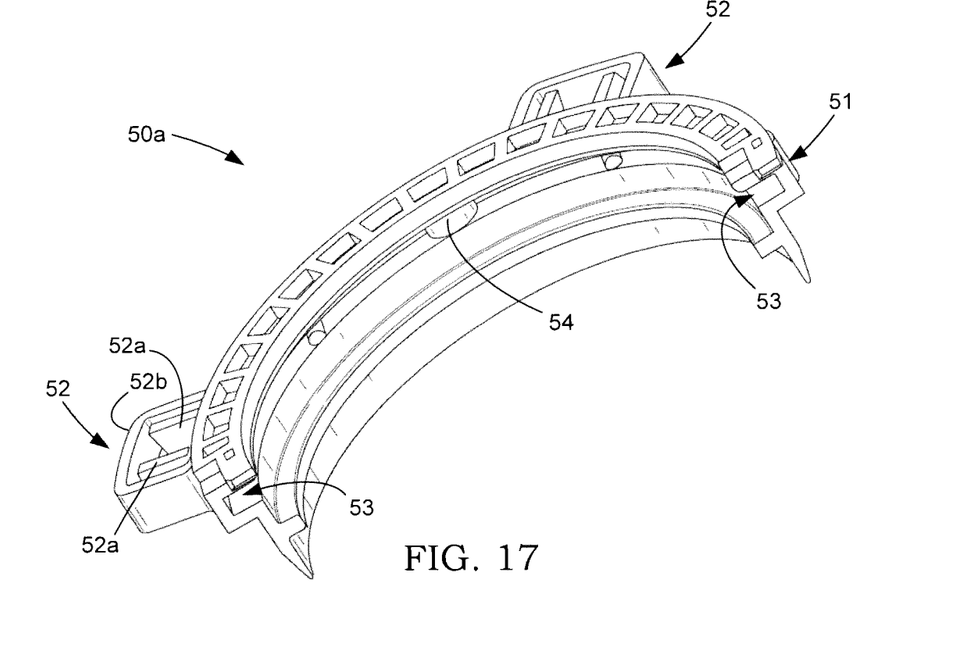
FIG. 17 is a perspective view of an exemplary embodiment of a portion of the locking member having an alignment feature for aligning the inflator and the locking member.

FIGS. 15-17 disclose an annular shaped locking member 50 configured to retain the inflator 21. The locking member 50 includes a first locking portion 50*a*, which may form substantially half of the annular member, and a second locking portion 50*b*, which may form substantially the other half of the annular member. The locking member 50 may be made out of two or more portions, and the portions may be configured with varying circumferential lengths, thus forming varying amounts of the locking member 50. The locking portions 50*a*, 50*b* may be made out of a composite (e.g., glass reinforced nylon, glass reinforced polypropylene) or any suitable material having the strength to withstand the high forces induced during airbag deployment, and may be made through an injection molding or any suitable process.

The locking portions may be configured to connect to the other locking portions through a connector or other feature. According to an exemplary embodiment, the first locking portion 50*a* is connected to the second locking portion 50*b* using a connector 51, whereby upon connection, the locking portions 50*a*, 50*b* of the locking member 50 retain the inflator 21 in place relative to the locking member 50 prohibiting substantial displacement of the inflator in the longitudinal direction relative to the locking member 50. The connector 51 may be configured to withstand the separation forces generated during airbag deployment.

The connector 51 of the locking member 50 may include a feature 51*a* of the first locking portion 50*a* that is configured to engage or couple to a mating feature 51*b* of the second locking portion 50*b*. The feature 51*a* may be configured as a hook shaped member that is configured to engage or fit into a similarly shaped void feature 51*b* in the other locking portion. The hook feature 51*a* may be configured to connect to another hook feature 51*b*, or may be configured to engage a mating feature 51*b* forming a cavity with a detent to retain the hook feature 51*a*. It should be noted that any known or future developed method of connecting two members may be used to connect the portions of the locking member, and those methods disclosed herein are not meant as limitations.

A portion of the connector 51 may be configured to be flexible and compliant, allowing for elastic flexing (or deflection) relative to a non-compliant or another compliant portion. The connector 51 may include a hook feature 51*a* of the connector 51 that is flexible and is configured to have an interference (or locking) fit with a substantially fixed detent formed in the mating feature 51*b* of the other locking portion. The flexible hook feature 51*a* may be configured to have a locking engagement with a void or slot on another locking portion. According to another exemplary embodiment, the locking portions 50*a*, 50*b* are coupled together by a weld (e.g., sonic weld). Additionally, each end of the locking portion, such as the first locking portion 50*a*, may include a connector 51, so that both ends of the locking portion may be coupled to the end of another locking portion, such as the second locking portion 50*b*. Those skilled in the art will recognize that any suitable method for coupling the locking member 50 together may be used, and those disclosed herein are not meant to be limitations.

The locking member 50 may be configured to include a feature to retain the inflator relative to the locking member 50. According to an exemplary embodiment, the locking member 50 includes an undercut portion (or cavity or recess) 53 that runs (or extends) substantially the circumferential length of the locking member 50. According to another exemplary embodiment, the cavity 53 extends along specific portions of the circumference having a length less than the total circumference of the locking member 50. The cavity 53 may have a cross-sectional shape (e.g., rectangular, semi-circular) tailored to receive a flange 21a of the inflator 21. When the flange 21a of the inflator 21 engages the cavity 53 (or retaining feature) of the locking member 50, the inflator may be substantially fixed to the locking member 50 in the longitudinal direction (i.e., along the longitudinal axis 29).

The locking member 50 may further include an alignment member (or feature) to align the rotational orientation or relationship between the locking member 50 and the inflator 21. According to an exemplary embodiment, the locking member 50 includes an alignment member 54 configured as a semi-circular emboss provided in the cavity 53, such as shown in FIG. 17, which may interrupt the undercut cross-section. The semi-circular alignment member 54 is configured to engage the alignment member 21b of the inflator 21, as shown in FIG. 16. The alignment member 21b of the inflator 21 is configured as a recessed portion in the flange 21a of the inflator 21, as shown in FIG. 4. According to other embodiments, the alignment member 54 may be configured as a polygonal shape or any suitable shape, which may be configured to mate with a similarly configured shape in the inflator. The alignment member 54 is configured to ensure repeatable rotational position (or alignment or orientation) of the inflator 21 relative to the locking member 50. This allows the inflator to be properly aligned or orientated relative to the airbag cushion to provide repeatable deployment positioning of the cushion in vehicle. Those skilled in the art will recognize that the inflator may be retained by the locking member 50 using any suitable method and the alignment member may form any shape.

The locking member 50 may further include an attachment member (or second coupling mechanism) 52 to connect the locking member 50 to the retaining member 40. According to the exemplary embodiment shown in FIGS. 16 and 17, the attachment member 52 is configured as a ring shaped portion 52b that extends from the outer surface (forming the outer circumference) of the locking member 50, whereby the ring shaped portion 52b includes two protruding portions 52a configured to retain the engaging portion of the attachment member 42 of the retaining member 40.

As shown in FIG. 12, the extruded portions 42a of the attachment member 42 of the retaining member 40 are configured to engage the protruding portions 52a of the attachment member 52 of the locking member 50 to couple the retaining member 40 and the locking member 50 together. The detent on each extruded portion 42a of the retaining member 40 may be configured to have an interference fit with the engaged portion of the locking member 50, so that during coupling of the retaining and locking members, the detent may cause the extruded portion 42a to flex (or displace) away from the protruded portion 52a to a displaced position. When the locking member 50 has been moved into a full engagement (or coupled) position relative to the retaining member 40, then the detent of the extruded portion 42a of the retaining member 40 passes beyond the end of the protruding portions 52a of the locking member 50 allowing the extruded portion 42a to return to a substantially free position (or pre-flex position). Therefore, once coupled, the protruded portions 52a of the attachment member 52 of the locking member 50 retain the extruded portions 42a of the attachment member 42 of the retaining member 40, as shown in FIG. 12.

The retaining member 40 may be connected to the locking member 50 through a joint formed by a welding process (e.g., sonic weld), through one or more than one fastener, or through a combination of methods. Those skilled in the art will recognize that any suitable method may be used to couple the locking member 50 to the retaining member 40, and those methods disclosed herein are not meant to be limitations.

Figure 19:
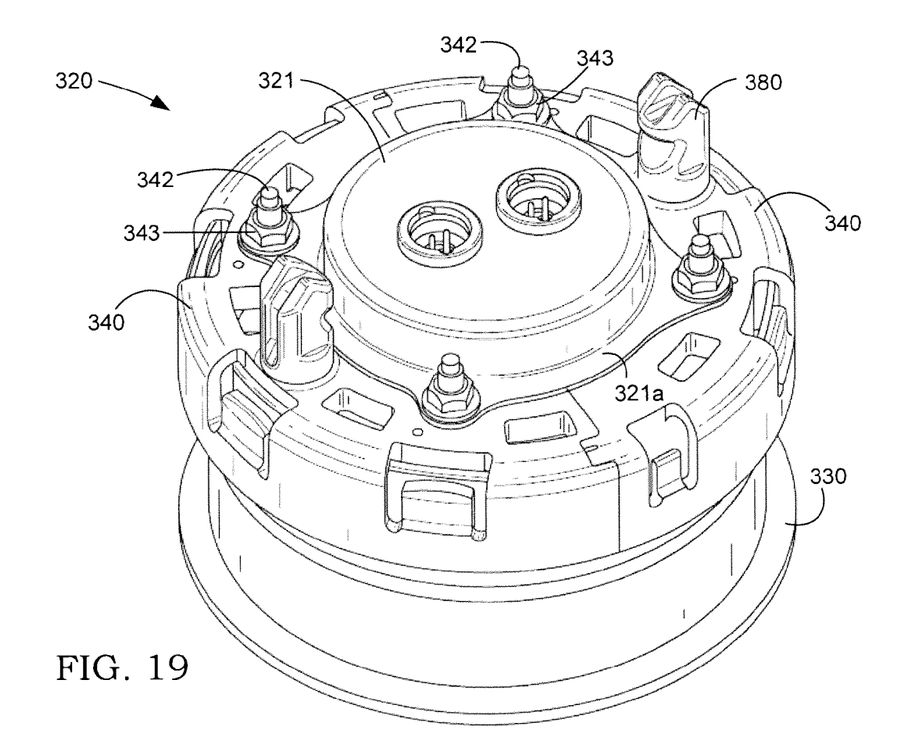
FIG. 19 is a perspective view of the driver-side airbag module.

As shown in FIGS. 18 and 19, according to an exemplary embodiment of a DAB module 320, a retaining member 340 may include a plurality of retaining portions. The module 320 may include an inflator 321 having a flange 321a with a plurality of openings, and a cushion pack (not shown) having an inflatable airbag cushion, and a cover 330. The opening (or aperture or hole) in the flange 321a of the inflator 321 is configured to receive a stud or conventional fastener (e.g., bolt) 342, such as shown in FIG. 19, to retain the inflator 321 to the retaining member 340. The retaining member 340 may be configured to include one or more studs 342 that may be integrally formed with the retaining member, or may be formed separately from and coupled (e.g., press-fit, threaded, snap-in) to the retaining member 340. The studs 342 may be configured to retain the inflator 321 to the retaining member 340 through nuts 343, or through any suitable method (e.g., staking, welding).

The airbag modules as disclosed herein provide for improved configuration of airbag modules by having reduced mass from a more efficient design having fewer components relative to conventional airbag modules. The airbag modules disclosed herein further allow for configuration of a vacuum folded airbag cushion, which may not be used if fasteners or other devices must pass through the airbag cushion to retain the cushion to other components. The airbag modules as disclosed herein having independent attachment features for the airbag cushion (or cushion pack), the cover, and the inflator allow for an automated assembly process having sequential assembly steps, which provides flexibility, improves efficiency and lowers cost.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag modules as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag module for use in a vehicle to provide restraint to an occupant of the vehicle, the airbag module comprising:
    a cushion pack including an inflatable airbag cushion configured to inflate to restrain the occupant of the vehicle;
    an inflator configured to provide inflation gas for inflating the airbag cushion;
    an annular retaining member including an inwardly protruding tab that engages an outwardly extending flange of the cushion pack in a direction generally opposing a direction of inflation of the airbag cushion to thereby retain a portion of the cushion pack in the airbag module during deployment of the airbag cushion; and
    an annular locking member connected to the inflator and configured to prohibit substantial displacement of the inflator relative to the locking member during deployment of the airbag cushion;
    wherein the locking member is connected to the retaining member.

2. The airbag module of claim 1, wherein the retaining member includes two curved and annularly extending portions that connect together.

3. The airbag module of claim 1, wherein the retaining member includes an alignment member that is complementary in shape to and configured to engage a corresponding alignment feature of the cushion pack to ensure proper positioning and alignment of the retaining member relative to the cushion pack.

4. The airbag module of claim 3, wherein the structural member of the cushion pack includes a recessed portion configured to engage the alignment member of the retaining member.

5. The airbag module of claim 1, wherein the locking member includes two curved and annularly extending portions that connect together.

6. The airbag module of claim 1, wherein the cushion pack includes a structural member connected to the airbag cushion, the structural member forming at least a portion of the flange of the cushion pack to engage the tab of the retaining member.

7. The airbag module of claim 6, wherein the structural member of the cushion pack is generally annular, and the retaining member includes a plurality of inwardly protruding tabs that engage the outwardly extending flange of the cushion pack.

8. The airbag module of claim 6, wherein the cushion pack includes a sealing member covering the airbag cushion, and at least a portion of the sealing member is arranged between the inwardly protruding tab of the retaining member and the structural member of the cushion pack.

9. The airbag module of claim 1, further comprising a cover having an annular wall that is connected to an annular wall of the retaining member.

10. The airbag module of claim 1, wherein the retaining member includes an alignment member configured to engage an alignment member of the locking member to ensure proper alignment and orientation of the retaining member relative to the locking member.

11. The airbag module of claim 1, wherein the flange is formed by a groove extending at least partially around a circumference of the cushion pack, and the inwardly protruding tab is positioned at least partly in the annular groove.

12. The airbag module of claim 1, wherein the inflator includes an outwardly extending flange that engages an inwardly extending flange of the locking member in a direction generally opposite a direction of inflation of the airbag.

* * * * *